(12) United States Patent
Horst et al.

(10) Patent No.: US 9,415,725 B2
(45) Date of Patent: Aug. 16, 2016

(54) LOAD COMPARTMENT ARRANGEMENT FOR A VEHICLE AND VEHICLE WITH THE LOAD COMPARTMENT ARRANGEMENT

(71) Applicant: GM GLOBAL TECHNOLOGY OPERATIONS LLC, Detroit, MI (US)

(72) Inventors: Thomas Horst, Buettelborn (IT); Thilo Schaefer, Gross-Gerau (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/558,473

(22) Filed: Dec. 2, 2014

(65) Prior Publication Data
US 2015/0151685 A1    Jun. 4, 2015

(30) Foreign Application Priority Data
Dec. 2, 2013  (DE) .......................... 10 2013 018 037

(51) Int. Cl.
*B60R 5/04* (2006.01)
(52) U.S. Cl.
CPC ...................................... *B60R 5/044* (2013.01)
(58) Field of Classification Search
CPC ........... B60N 2002/363; B60N 2/3013; B60N 2/305; B60N 2/36; B60R 5/04
USPC ........ 296/24.44, 37.16, 37.14, 24.43, 107.08, 296/37.7, 37.8; 224/542, 291.1; 410/156, 410/89, 141, 121, 129
See application file for complete search history.

(56) References Cited

U.S. PATENT DOCUMENTS

| | | | |
|---|---|---|---|
| 4,718,584 A * | 1/1988 | Schoeny | 224/42.34 |
| 6,439,633 B2 * | 8/2002 | Nemoto | 296/37.14 |
| 7,600,800 B2 * | 10/2009 | Suzuki | 296/37.16 |
| 7,794,005 B2 | 9/2010 | Storgato et al. | |
| 7,950,712 B2 | 5/2011 | Karaki et al. | |
| 8,186,736 B2 | 5/2012 | Jouraku | |
| 2002/0070574 A1 * | 6/2002 | Carlsson et al. | 296/37.14 |
| 2003/0222475 A1 * | 12/2003 | Nakamitsu et al. | 296/37.16 |

FOREIGN PATENT DOCUMENTS

| | | |
|---|---|---|
| DE | 102011114621 A1 | 4/2013 |
| DE | 102012207281 A1 | 6/2013 |
| EP | 2033842 A2 | 3/2009 |

(Continued)

OTHER PUBLICATIONS

Great Britain Patent Office, Great Britain Search Report for Great Britain Application No. 1416811.6, dated Feb. 10, 2015.

*Primary Examiner* — Glenn Dayoan
*Assistant Examiner* — Sunsurraye Westbrook
(74) *Attorney, Agent, or Firm* — Ingrassia Fisher & Lorenz PC

(57) ABSTRACT

A load compartment arrangement for a vehicle is disclosed. The load compartment arrangement includes a board device with a loading board having a flap section pivotably connected to one another. The flap section assumes an upper position such that the loading board is in a low position. Conversely, the flap section assumes a lower position such that the loading board is a high position. The load compartment arrangement includes at least one load compartment-fixed holding device for holding the flap section in the lower position. A basic body of the flap section supports itself in the holding device and is secured in a direction directed towards the load compartment floor in a positively joined manner when the flap section assumes the lower position.

18 Claims, 3 Drawing Sheets

(56) References Cited

FOREIGN PATENT DOCUMENTS

| | | | |
|---|---|---|---|
| EP | 2444285 | A1 | 4/2012 |
| FR | 2946594 | A3 | 12/2010 |
| FR | 2962952 | A1 | 1/2012 |
| FR | 2981894 | A3 | 5/2013 |
| FR | 2982217 | A3 | 5/2013 |
| FR | 2986757 | A1 | 8/2013 |
| JP | 2005306361 | A | 11/2005 |
| WO | 2013153310 | A1 | 10/2013 |

\* cited by examiner

LOAD COMPARTMENT ARRANGEMENT FOR A VEHICLE AND VEHICLE WITH THE LOAD COMPARTMENT ARRANGEMENT

CROSS REFERENCE TO RELATED APPLICATION

This application claims priority to German Patent Application No. 102013018037.6 filed Dec. 2, 2013, which is incorporated herein by reference in its entirety.

TECHNICAL FIELD

The present disclosure relates to a load compartment arrangement for a vehicle and to a vehicle with the load compartment arrangement.

BACKGROUND

In almost any vehicle a load compartment for loading in objects is integrated in the rear region. From the prior art, boards for the load compartment which are adjustable in the height are known. Thus, the load compartment can be divided in a higher position of the board and in a lower position placed onto the load compartment floor.

The publication DE 10 2009 003 635 A1 describes a trunk board with a board body, which is arranged in a luggage region of a vehicle. The board body is designed moveable between an upper position and a lower position. In the upper position, it separates the luggage region into upper and lower regions. The trunk board includes a holding section, which is rotatably connected to the board body via a joined section, so that it guides the board body when the latter is moved from the upper into the lower position. The holding section is pivotably held by lateral edges of the luggage region on the side that is opposite to the joined section via a holding pin. The board body and the holding section are preloaded via a spring unit so that these are pulled towards one another via the joined section.

SUMMARY

The present disclosure provides a functional, component-reduced load compartment arrangement that is simple to handle. A load compartment arrangement for a vehicle, in particular for a passenger car is disclosed. The load compartment arrangement includes a load compartment, which is preferably arranged in the rear region of the vehicle. The load compartment is designed for example as a trunk of the vehicle.

The load compartment arrangement includes a first and second side wall, a load compartment floor and optionally complementarily a loading edge, which is arranged in a transition region to a load compartment opening. The load compartment is bounded by the first and second side wall and by the load compartment floor. Optionally complementarily, the load compartment is bounded by the loading edge, a rear seat bench of the vehicle and by a vehicle roof.

The load compartment arrangement includes a board device with a loading board and with a flap section. The loading board and the flap section are pivotably connected to one another, in particular on a first end of the loading board. For example, the loading board and the flap section can be pivoted relative to one another by at least 200 degrees, preferably by at least 230 degrees, and in particular by at least 300 degrees. For example, the loading board and the flap section are formed of a plastic material, in particular of a hard plastic material and/or include this.

The flap section can assume an upper position or a lower position. Preferably, the flap section in the upper position projects from the loading board in the direction of the vehicle roof and in the lower position in the direction of the load compartment floor.

The loading board assumes a low position in the load compartment when the flap section is in the upper position. It assumes a high position, when the flap section is in the lower position. In the low position of the loading board, the loading board rests on the load compartment floor, and in the high position it is arranged spaced from the load compartment floor.

The load compartment arrangement includes at least one load compartment-fixed holding device, which is designed for holding the flap section when the flap section is in the lower position and when the loading board assumes the high position. For example, the holding device is arranged on the side walls and/or on the load compartment floor. It is also possible that the holding device is integrated in the side walls and/or in the load compartment floor.

The flap section includes a basic body which supports itself in the holding device and is secured in a positively joined manner in a direction directed towards the load compartment floor, when the flap section assumes the lower position. In particular, the basic body supports itself in the holding device via its standing surface. Preferably, the basic body of the flap section is formed of a base material, in particular plastic material. In particular, it includes defined longitudinal edges and width edges without interfering contours, protrusions and/or shoulders. Here, the basic body is formed for example cuboid in shape. In particular, the basic body and/or the flap section are/is designed as a cutout from a flat material. Particularly preferably, the flap section supports itself on the holding device with a base area of the basic body. In an alternative configuration, the basic body of the flap section can also be designed as a PU-honeycomb board.

It is advantageous that the basic body of the flap portion supports itself direction on the holding device. Additional components for mounting the flap section can be advantageously omitted. Thus, a manufacturing effort of the board device can be reduced. Furthermore, at least one part of the weight of the plate device can be directly transferred onto the holding device via the basic body. This supports stabilizing the board device when the flap section assumes the lower position and the loading board is in the high position. Particularly preferably, the flap section forms a supporting leg for the plate device. In particular, the loading board supports itself in a positively joined manner in the gravity direction and/or perpendicularly to the surface extension of the loading board on the flap section and the flap section in the same direction on the holding device.

In a preferred configuration of the present disclosure, the holding device is designed as at least one groove, in particular as a first and second groove. Preferably, the at least one groove has a groove length of at least 10 millimeters, preferably of at least 25 millimeters and in particular of at least 40 millimeters. The groove length is preferably the length of a support surface in longitudinal extension of the flap section, on which the basic body of the flap portion rests and on which it supports itself towards the bottom.

In a preferred design implementation of the present disclosure the holding device projects from the first and from the second side wall and into the load compartment. In particular, the first groove is arranged on the first side wall and the second groove on the second side wall and projects from the latter into the load compartment. Alternatively, the holding device extends completely from the first side wall to the second side wall. Preferably, the holding device, in particular as a separate component, is arranged on the load compartment floor and/or stands on the latter. For example, the load compartment floor forms a surface for the holding device, wherein the holding device supports itself on the load compartment floor. Through the holding device standing on the load compartment floor at least one part of the weight of the board device can be indirectly discharged onto the load compartment floor.

Also possible within the scope of the present disclosure is that the holding device is integrated in the load compartment floor. Here, the holding device can be introduced in sections into the load compartment floor or extend completely over the entire width of the load compartment floor. Thus, a direct weight discharge of the flap section can advantageously take place in the lower position and the board arrangement on the load compartment floor.

Through the direct or indirect weight discharge onto the load compartment floor, the stability of the board arrangement is further increased. Thus, heavy objects can also be placed onto the board device when the loading plate assumes the high position and the flap section the low position.

A further preferred embodiment of the present disclosure provides that the basic body of the flap section is secured in a positively joined manner in the holding device against shifting and/or tilting in and against the travelling direction of the vehicle. In particular, a secure stand of the board device is made possible through the positive joint in and against the travelling direction. Optionally complementarily, the basic body of the flap section is secured in a positively joined manner in the lower position through the first and second side wall in a vehicle transverse direction. Thus, shifting of the flap section and of the board arrangement in a vehicle transverse direction is avoided.

The holding device is preferably limited in the height. Here it has a maximum height which does not exceed starting out from the load compartment floor preferably 25 millimeter, in particular 50 millimeter, and specifically 100 millimeter.

It is particularly preferred that the basic body of the flap section supports itself linearly on the holding device at least in sections when the flap section assumes the lower position. In particular, the basic body of the flap section supports itself in the lower position on the support surface of the holding device. A support length, with which the basic body linearly rests on the support surface amounts to at least 10 millimeter, preferably at least 25 millimeter, in particular at least 40 millimeter. Alternatively it is preferred within the scope of the present disclosure that the basic body of the flap section linearly supports itself in the holding device completely over its entire length when the flap section assumes the lower position. In this case, the support length of the basic body corresponds to a width of the load compartment.

In a preferred configuration of the present disclosure, the flap section is designed as a bridging device when it assumes the upper position. As bridging device, the flap section bridges a spacing between the load compartment and/or the loading board and the rear seat bench. To this end, the flap section as a function of the size of the angle by which it is pivoted relative to the loading board abuts the rear seat bench with its free end or even in surface contact. Because of the fact that the flap section can be pivoted relative to the loading board it can adapt itself automatically to an inclined position of the backrest and/or to a shift of the rear seat bench in or against the travelling direction of the vehicle. Thus, flexible bridging of the spacing is ensured. It is advantageously prevented that objects inadvertently fall between the board device and the rear seat bench.

In a preferred implementation of the present disclosure, the loading board, in particular on its second end, rests on a loading edge of the load compartment. Because of this, it is held at the height by its second, in particular free end in the high position. Within the scope of the present disclosure it is preferred that the loading board includes an engagement device, with which it engages in an engagement section of the load compartment arrangement when the loading board is in the high position. For example, the engagement device is arranged on the second end of the loading board. Preferably, the engagement section is arranged on or at the loading edge of the load compartment. By engaging the engagement device in the engagement section the board device, in particular, the loading board is secured in a positively joined manner against shifting and/or tilting in and against the travelling direction. Alternatively, the engagement device can be arranged on the longitudinal sides of the loading board and the engagement section accordingly on the first and second side wall.

It is possible that the loading board supports itself exclusively via the support on the loading edge and the flap section in the direction of gravity and/or in a direction perpendicularly to the surface extension of the loading board. In particular, the lateral edges of the loading board and/or the loading board itself extend/s support-free between the flap section and the loading floor.

Preferably, the load compartment arrangement includes a support device on which the loading board supports itself when it assumes the high position. Preferably, the support device is arranged on the first and second side wall and/or integrated in these. Here, the support device preferably projects from the first and second side wall in the direction of the load compartment. For example, the support device is designed as a peg, jaw or beam. In particular, the support device includes a support surface on which the loading board rests and is supported in the high position. Through the support device, the loading board is advantageously stabilized in the high position in particular when heavier objects are placed thereon. Sagging and/or damaging of the loading board during the loading with objects can thus be avoided.

Preferably, the board device in the high position of the loading board together with the loading edge and the load compartment floor encloses a stowage space within the load compartment. In particular, the loading board in the high position forms an intermediate floor in the load compartment, which divides the load compartment into an upper and into a lower space section. For example, the board device in the high position of the loading board and in the lower position of the flap section forms a box or chest within the load compartment. It is advantageous that objects which are stowed in the stowage space are concealed by the board device and are thus not visible from the outside. It is advantageous furthermore that the loading board as intermediate floor can be simultaneously used for placing objects. Thus, the load compartment can be very flexibly utilized and loaded.

It is preferred, furthermore, that the board device in the low position of the loading board, in particular together with the loading edge, forms a trough in the load compartment. In particular, the loading board in the low position rests on the load compartment floor and the flap section still projects at the top in the direction of the vehicle roof and/or of the rear seat bench from the latter. In the low position of the loading board, almost any total height of the load compartment can be utilized for loading objects. In particular, objects can be placed on the loading board resting on the load compartment floor.

Because of this, the load compartment floor is protected from dirt and/or damage. At the same time, inadvertent shifting of objects into a gap between the rear seat bench and the load compartment and/or the loading board is avoided since the flap section in the upper position abuts the rear seat bench and forms the bridging device.

In a preferred implementation of the present disclosure, the loading board and the flap section are pivotably connected to one another via a hinging device. Preferably, the hinging device is formed through a common cover layer of the loading board and of the flap section. Preferably, the cover layer is connected to the loading board and the flap section in a positively joined manner. For example, the cover layer is formed flexibly and/or pliably. In particular, the cover layer includes a fabric and/or is designed as a fabric. Specifically, the cover layer is formed as a carpet.

It is particularly preferred that the board device can be arranged and/or is arranged in the load compartment free of positive guidance. In particular, the board device can be removed from and inserted into the load compartment without tools. Pivoting of the flap section relative to the loading board is preferably effected in the state in which it is removed from the load compartment through the effect of gravity and/or manual pivoting. In particular, the flap section is designed transferable from the upper into the lower position through gravity or manually.

In a preferred further development of the present disclosure, the holding device includes a ramp section, which is designed in particular as a guide that is open towards the top and/or as a support guide for the flap section. The ramp section is preferably arranged on a side of the holding device facing the loading board and/or on the in travelling direction rear side of the holding device or even on both sides regarding the holding device and guides the flap section into the upper position when the flap section is pushed in.

A further object of the present disclosure relates to a vehicle with the load compartment arrangement according to any one of the preceding claims.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
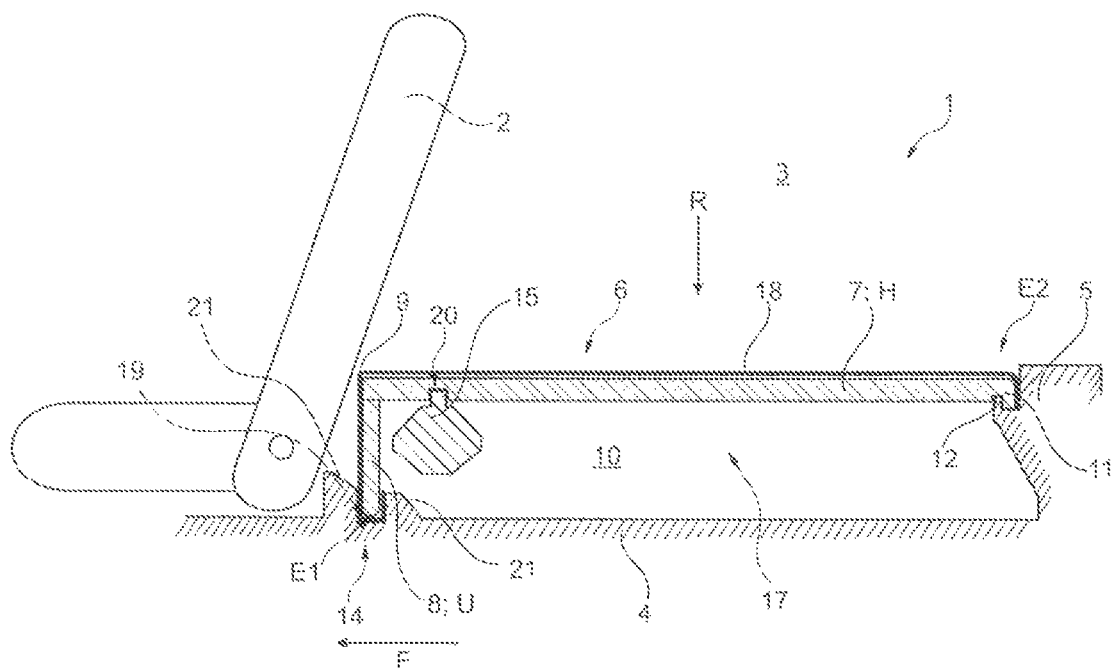
FIG. 1 is a section through a load compartment arrangement for a vehicle with a loading board in a high position.

FIG. 1 shows a section through a load compartment arrangement 1 for a vehicle, for example a passenger car. The section line runs in a travelling direction F of the vehicle. The vehicle includes a rear seat bench 2, on which occupants of the vehicle can take a seat. The load compartment arrangement 1 includes a load compartment 3, which is arranged in a rear region of the vehicle. The load compartment is designed for example as a trunk of the vehicle. It is bounded by a vehicle roof which is not shown, by a first and second side wall 17 (the first side wall is shown transparently), by a load compartment floor 4 and by a loading edge 5 at the rear end.

The load compartment arrangement 1 includes a board device 6. The board device 6 includes a loading board 7 and a flap section 8. The loading board 7 and the flap section 8 are designed as rigid plastic boards.

The board device 6 includes a hinge device 9, via which the flap section 8 and the loading board 7 are pivotably connected to one another at a first end E1 of the loading board. The hinge device 9 is formed by a flexible and/or pliable cover layer 18, which jointly covers the loading board 7 and the flap section 8. The flexible and/or pliable cover layer 18 includes a fabric. It is formed for example as a carpet which is applied over a materially joined connection on the loading board 7 and on the flap section 8.

The board arrangement 6 can be inserted into the load compartment 3 and removed from the same without tools. In particular, the board device 6 can be arranged and/or is arranged in the load compartment 3 free of positive guidance. In the state removed from the load compartment 3 the flap section 8 can be pivoted relative to the loading board 7 via the hinge device 9.

The load compartment arrangement 1 includes at least one holding device 13, which is arranged in the load compartment 3 fixed in the load compartment. The holding device 13 is designed as at least one groove 14. According to the FIGS. 1 and 2, the holding device 13 is integrated in the load compartment floor 4. Here, it extends completely from the first side wall as far as to the second side wall 17.

Figure 3:
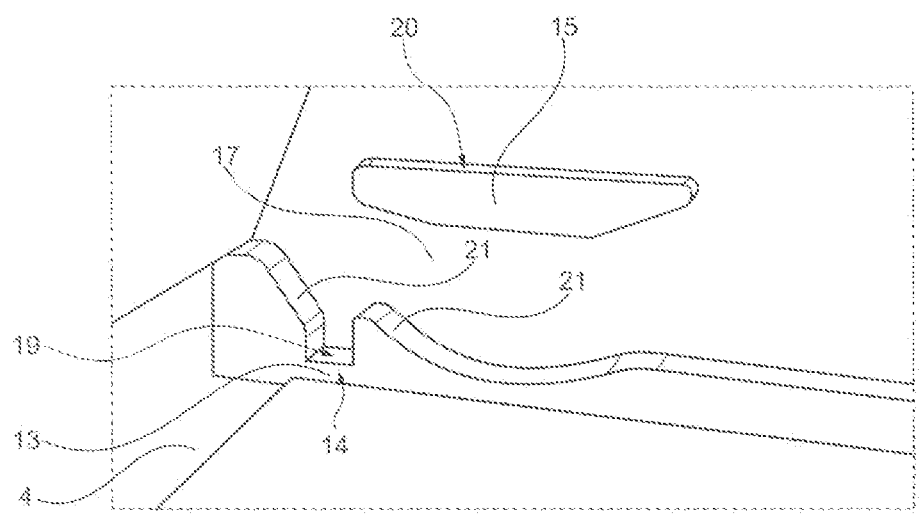
FIG. 3 is a top view of a side wall of a load compartment and of a holding device.

FIG. 3 shows an alternative exemplary embodiment of the holding device 13. Here, the holding device 13 is formed as a first and second groove 14 and placed onto the load compartment floor 4. The first groove (not shown) projects from the first side wall and the second groove 14 from the second side wall 17 in each case by a groove length into the load compartment 3. The groove length of the first and second groove 14 includes at least 10 millimeter, preferably at least 25 millimeter and in particular at least 40 millimeter. Through the groove length of the first and second groove 14 a support surface 19 for a basic body of the flap section 8 is formed, when the latter assumes a lower position U.

According to FIG. 1, the flap section 8 is pivoted into the lower position U. Here, the flap section 8 projects in the direction of the load compartment floor 4 at a right angle or substantially at a right angle from the loading board 7. When the flap section 8 assumes the lower position U the loading board 7 is in a high position H. When the loading board 7 assumes the high position H, it forms an intermediate floor in the load compartment 3 on which objects can be placed. Here, it encloses a stowage space 10 that is separated from the remaining compartment 3 together with the flap section 8, the load compartment floor 4 and the loading edge 5. In particular, the board device 6 forms a box or chest that can be erected on the load compartment floor 4 in which objects can be stowed invisibly from the outside.

The flap section 8 includes a basic body which supports itself in the lower position U in the holding device 13 and because of this is secured in a positively joined manner in a direction directed towards the load compartment floor 4. In particular, the basic body of the flap section 8 linearly rests on the support surface 19 of the holding device 13, wherein the weight of the board device 6 and if appropriate of the objects placed on the loading board 7 is at least partly discharged to the holding device 13 via the basic body of the flap section 8. The weight discharge according to FIG. 1 is affected directly onto the load compartment floor 4 since the holding device 13 is integrated in the same. According to FIG. 3, the weight is indirectly discharged onto the load compartment floor 4 via the holding device 13 placed onto the load compartment floor 4.

The force flow runs from the loading board 7 via the connection and the flap section 8 into the holding device 13, wherein the loading board 7 supports itself on the flap section 8 in a positively joined manner.

Additionally to the positively joined connection in the direction of the load compartment floor 4, the basic body of the flap section 8 is also secured against shifting and/or tilting in a positively joined manner in the holding device 13 in and against the travelling direction F of the vehicle through groove walls. In addition, the flap section 8 and the board device 6 are secured in a positively joined manner in a vehicle transverse direction via the first and second side wall 17.

In order to achieve sufficient stability in the high position H of the loading board 7, the loading board 7 at its second end E2 includes an engagement device 11, with which it engages in an engagement section 12 arranged on the loading edge 5. Thus, the loading board 7 in the high position H is secured in a positively joined manner against shifting in and against the travelling direction F of the vehicle. In an alternative exemplary embodiment, the loading board 7 can also be merely placed onto the loading edge 5 when it assumes the high position H. Introducing the engagement device 11 can be omitted in this case and production costs thereby saved.

Figure 2:
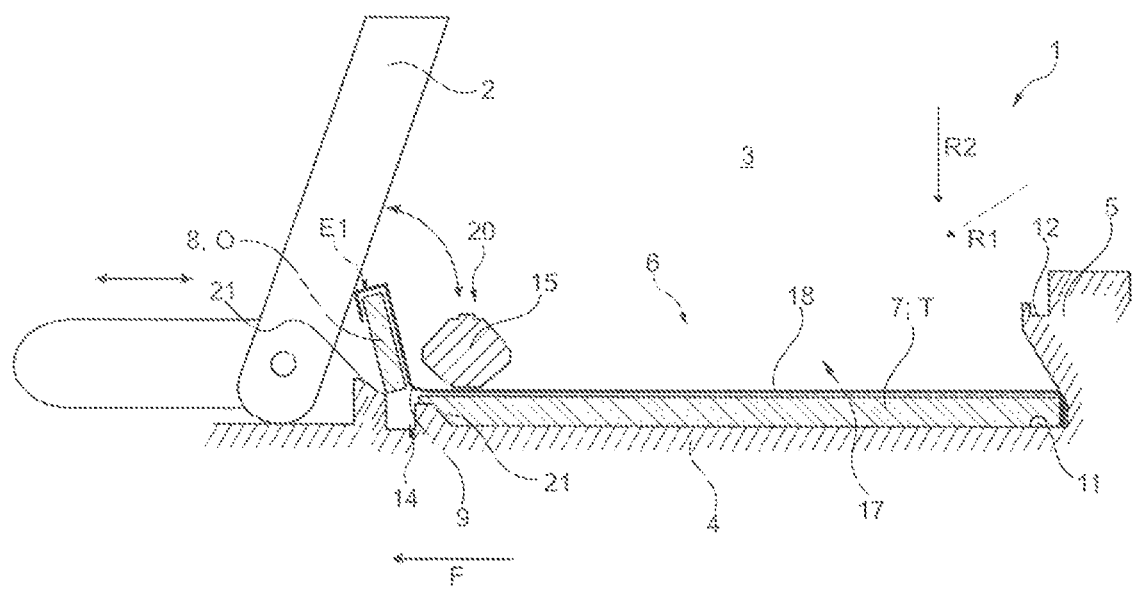
FIG. 2 is the load compartment arrangement from FIG. 1, wherein the loading board assumes a low position.

The load compartment arrangement 1 includes a support device 15 which is arranged on the first and second side wall 17 and/or integrated in these. The support device 15 according to FIGS. 1 and 2 is diamond-shaped and has a concentrated support surface 20 for the loading board 7 in the high position H.

FIG. 3 shows an alternative exemplary embodiment of the support device 15. Here, the support device 15 is designed as a beam fitted onto the first and second side wall 17. In the design of the support device 15 as a beam, it has an elongated linear support surface 20. In a further alternative exemplary embodiment, the support device 15 can also be designed as a peg or jaw projecting from the side wall 17 for supporting the loading board 7 in the high position H.

Through the supporting of the loading board 7 in the high position on the support surface 20 of the support device 15, further stabilization of the board device 6 in the high position H of the loading board 7 is achieved. Thus, even heavy objects can be loaded onto the loading board 7 when the same assumes the high position H and forms the intermediate floor for the load compartment 3.

An assembly and/or insertion direction R of the board device 6 with the loading board in the high position H and the flap section in the lower position U into the load compartment 3 is directed in the direction of the load compartment floor 4. Here, the board device 6 with the flap section 8 in the lower position U is placed in the load compartment 3 perpendicularly on the load compartment floor 4 so that the basic body of the flap section 8 is arranged in the holding device 13 where it is supported in a positively joined manner. The loading board 7 is supported at the same time on the support surface 20 of the support device 15. The second end E2 of the loading board 7 is placed onto the loading edge 5 and/or engages in the engagement section 12 with the engagement device 11.

FIG. 2 shows the load compartment arrangement 1 with the board device 6, wherein the flap section 8 assumes an upper section O and the loading board 7 a low position T. In the low position T, the loading board 7 rests on the load compartment floor 4.

In the upper position O, the flap section 8 projects from the loading board 7 in the direction of the vehicle roof and abuts the rear seat bench 2. Through the hinge device 9, the flap section 8 automatically adapts to an inclined position or shifted position of the rear seat bench through pivoting. Here, the flap section 8 is formed as a bridging device for bridging a spacing between the load compartment 3 and/or the loading board 7 and the rear seat bench 2. Because of this it can be avoided that objects fall into a gap between the load compartment 3 and/or the loading board 7 and the rear seat bench 2.

The board device 6 forms a trough in the load compartment 3 when the flap section 8 is in the upper position O and the loading board 7 in the low position T. In the design of the board device 6 as a trough, a load compartment height can be almost completely utilized for loading with objects. In particular, objects can be placed on the loading board 7 which in the low position T rests on the load compartment floor 4. Because of this, the load compartment floor 4 is protected from dirt and/or damage through the loaded objects.

A first assembly and/or insertion direction R1 of the board device 6 with the loading board 7 in the low position T and the flap section 8 in the upper position O is initially directed obliquely downwards and in travelling direction F. Here, the board device 6 is placed with the flap section 8 obliquely onto the load compartment floor 4 and pushed along in travelling direction F so that the flap section 8 slips through under the support device 15 and on pushing further forward automatically pivots upwards through the bearing against two ramp sections 21 of the holding device 13 on the rear seat bench 2 and is transferred into the upper position O. The ramp sections 21 are designed as a slide channel or guide rail which is opened towards the top and guide the flap section 8 with its free end into a position that is directed towards the vehicle headlining or towards the top. The ramp sections 21 can be arranged on both sides of the groove 14. The slope angle of the ramp sections 21 arranged on both sides of the groove 14 is identical or at least directed in the same direction so that the ramp sections 21 run parallel or in the same direction to one another. Tests have shown that even only one of the ramp sections 21 can be adequate, wherein the ramp section 21 on the side of the groove 14 or of the holding device 13 facing the loading board 7 is used as sole ramp section 21. This ramp section 21 is arranged on the in travelling direction rear side of the groove 14 or of the holding device 13. A second assembly and/or insertion direction R2 is directed downwards towards the load compartment floor 4. Here, the loading board 7 is placed onto the load compartment floor 4 as soon as the flap section 8 has assumed the upper position O and abuts the rear seat bench 2 as bridging device 8.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A load compartment arrangement for a vehicle having a load compartment which is bounded by a first and a second side wall and by a load compartment floor, the load compartment arrangement comprising:

a board device having a loading board with a flap section pivotably connected thereto; the flap section being positionable in an upper position wherein the loading board assumes a low position and a lower position wherein the loading board assumes a high position;

at least one holding device configured to be fixed to the load compartment to hold the flap section in the lower position, the holding device comprising at least one groove arranged on the load compartment floor with at least one ramp section defined adjacent to the at least one groove, and the flap section is received in the at least one groove for the loading board to assume the high position and is spaced apart from the at least one groove for the loading board to assume the low position; and wherein the loading board is configured to rest on the load compartment floor when in the low position and is configured to be spaced apart from the load compartment floor when in the high position;

wherein the flap section supports itself in the at least one groove and is secured in a positively joined manner in a direction directed to the load compartment floor when the flap section assumes the lower position.

2. The load compartment arrangement according to claim 1, wherein the at least one groove has a groove length to receive at least a portion of the flap section.

3. The load compartment arrangement according to claim 1, wherein the holding device is configured to project from the first and second side wall into the load compartment.

4. The load compartment arrangement according to claim 3, wherein the holding device is configured to extend completely from the first side wall to the second side wall.

5. The load compartment arrangement according to claim 1, wherein the basic body of the flap section in the lower position is secured in the at least one groove against movement in and against a travelling direction of the vehicle in a positively joined manner.

6. The load compartment arrangement according to claim 1, wherein the basic body of the flap section in the lower position linearly supports itself in the at least one groove at least in sections.

7. The load compartment arrangement according to claim 1, wherein the flap section in the upper position is formed as a bridging device which is configured to bridge a spacing between the load compartment, and at least one of the loading board and a rear seat bench of the vehicle.

8. The load compartment arrangement according to claim 1, wherein the loading board comprises an engagement device configured to engage in the high position in an engagement section of the load compartment arrangement, whereby the loading board is secured in and against the travelling direction of the vehicle in a positively joined manner.

9. The load compartment arrangement according to claim 1, wherein the load compartment arrangement comprises a support device on which the loading board is self-supported in the high position.

10. The load compartment arrangement according to claim 1, wherein the board device in the high position together with a loading edge of the load compartment arrangement and the load compartment floor encloses a stowage space within the load compartment.

11. The load compartment arrangement according to claim 1 further comprising a hinge device pivotally connecting the loading board and the flap section.

12. The load compartment arrangement according to claim 11 wherein the hinge device is formed through a joint flexible between the loading board and the flap section.

13. The load compartment arrangement according to claim 11 wherein the hinge device is formed through a pliable cover layer over the loading board and the flap section.

14. The load compartment arrangement according to claim 13, wherein the cover layer is formed as a fabric.

15. The load compartment arrangement according to claim 1, wherein the board device is configured to be arranged in the load compartment free of positive guidance.

16. The load compartment arrangement according to claim 1, wherein the board device is configured to be removed from the load compartment and reinserted in the same without tools.

17. The load compartment arrangement according to claim 1, wherein the flap section is transferred from the upper position into the lower position with the assistance of gravity.

18. A vehicle including a load compartment arrangement, the vehicle comprising:
  a load compartment which is bounded by a first and a second side wall and by a load compartment floor;
  the load compartment arrangement comprising:
    a board device having a loading board with a flap section pivotably connected to the loading board, the flap section positionable in an upper position in which the loading board assumes a low position and a lower position in which the loading board assumes a high position; and
    a holding device fixed to the load compartment to hold the flap section in the lower position, the holding device comprising at least one groove arranged on the load compartment floor with at least one ramp section defined adjacent to the at least one groove, and the flap section is received in the at least one groove for the loading board to assume the high position and is spaced apart from the at least one groove for the loading board to assume the low position,
    wherein the loading board rests on the load compartment floor in the low position and is spaced apart from the load compartment floor in the high position, the flap section supports itself in the at least one groove and is secured in a positively joined manner in a direction directed to the load compartment floor in the lower position.

* * * * *